Patented May 15, 1934

1,958,770

UNITED STATES PATENT OFFICE 1,958,770

DERIVATIVES OF MERCAPTO ARYL THIAZOLES

Lorin B. Sebrell, Akron, Ohio, assignor to Wingfoot Corporation, Wilmington, Del., a corporation of Delaware No Drawing. Application December 13, 1927, Serial No. 239,815

33 Claims. (Cl. 260—16)

My invention relates to a new class of compounds and it has particular relation to a class of materials which may be employed as accelerators of the rate of vulcanization of rubber, as dye intermediates and for various other purposes. More specifically, the invention has for one of its objects the provision of a class of substituted aryl thiazoles heretofore unknown to the chemical art.

This invention consists in the discovery of a new class of substituted mercapto aryl thiazoles in which one or more of the hydrogen atoms of the aryl nucleus have been replaced by other materials; for example, nitro groups, chlorine groups, amino groups, etc. The use of certain of these materials as accelerators of vulcanization of rubber compounds is disclosed and claimed in my copending application Serial No. 87,950, filed February 12, 1926, since issued as Patent 1,679,548, of which this application is a continuation in part. The use of still others is disclosed and claimed in application Serial No. 87,949, filed February 12, 1926, by Jan Teppema, now Patent 1,637,790.

The material known as 5-nitro 1-mercaptobenzothiazole is a specific example of a compound which falls within the scope of the invention. The molecular structure of this substance may be represented by the following formula:

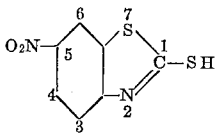

This compound may be prepared by dissolving 50 grams of 1-mercaptobenzothiazole in 250 grams of concentrated sulphuric acid and adding to the solution 40 grams of fuming nitric acid intermixed with 55 grams of concentrated sulphuric acid. The addition should be effected slowly and while the mixture is being cooled upon a bath of ice intermixed with salt. The solution should be stirred during the addition of the nitric acid solution, the stirring being continued for a further period of approximately one hour. The solution should then be poured upon ice and the precipitate filtered, washed with water and dried.

The resulting product is a mixture of 5-nitro 1-mercaptobenzothiazole and the corresponding disulphide, the molecular structure of which may be represented by the following formula:

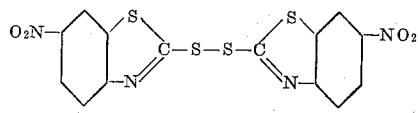

The 5-nitro 1-mercaptobenzothiazole may be separated from the disulphide by treatment with an alkaline solution, such as ammonia, in which the former is readily soluble. The disulphide remaining after treatment of the mass with the alkaline solution may, if desired, be transformed into the free mercaptan by boiling it a number of times with solutions of ammonia, each solution, after having been heated to the boiling point, being poured off and a new solution being added and heated. Eventually the major portion of the disulphide is converted into the free mercaptan. Upon addition of a dilute acid, such as, for example, hydrochloric acid or acetic acid to the solution obtained by dissolving the 5-nitro 1-mercaptobenzothiazole originally formed or to the combined solutions obtained by transforming the disulphide to the free mercaptan, 5-nitro 1-mercaptobenzothiazole separates as a yellow precipitate which may be filtered off and dried. The dried product may be purified by dissolving it in glacial acetic acid and permitting it to precipitate out in the form of yellow needle-like crystals, which have a melting point ranging from 255 to 257° C.

There is a marked difference between the disulphide of 5-nitro 1-mercaptobenzothiazole and the disulphide of the 1-mercaptothiazole in that the latter compound does not break up upon the addition of alkalis to produce the free mercaptan.

The compound 5-nitro 1-mercaptobenzothiazole may be reduced to the corresponding 5-amino 2-mercaptobenzothiazole by dissolving 50 grams of 5-nitro 1-mercaptobenzothiazole in a solution of 75 grams of sodium sulphide (Na₂S.9H₂O) in 250 cc. of water which has previously been saturated with hydrogen sulphide. The solution is then heated upon a steam bath under a reflux condenser for a period of 24 hours while hydrogen sulphide is bubbled therethrough and thereafter acidified with dilute acetic acid and heated in a steam bath in order to cause complete precipitation of the reaction product. The precipitate, consisting of 5-amino 1-mercaptobenzothiazole and sulphur, is filtered off and the solid is treated with a hot solution of ammonia. Dilute acetic acid is added to the ammonia solution, whereupon 5-amino 1-mercaptobenzothiazole separates as a white precipitate which may be purified by means of a suitable solvent, such as aniline, and obtained as a crystalline product. It may also be purified by dissolving it in pyridine and precipitating it with chloroform. The melting point of the crystalline product is approximately 260° C.

Amino substituted mercapto aryl thiazoles such as 5-amino 1-mercaptobenzothiazole combine readily with benzaldehyde in alcoholic solution to produce the corresponding benzal amino mercapto aryl thiazoles, of which 6-benzal amino mercaptobenzothiazole, melting at 226° C., is an example. The amino group of an amino-substituted mercapto aryl thiazole such as 5-amino 1-mercaptobenzothiazole may also be diazotized by treating the compound with an excess of a solution of sodium nitrite, the procedure commonly employed where sodium nitrite is used as the diazotizing agent being followed. The resulting diazo derivative may then be treated with a halogen acid such as hydrochloric or hydrobromic acid in the presence of cuprous chloride or bromide to replace the diazonium group by a halogen atom, thus producing the corresponding halogen-substituted mercapto aryl thiazole. An example of such a compound is 5-chlor 1-mercaptobenzothiazole.

Halogen substituted mercapto aryl thiazoles such as 5-chlor 1-mercaptobenzothiazole may be caused to react further to effect the introduction into the molecule of a nitro group by treatment of the compound with fuming nitric acid in accordance with the method herein described for the preparation of 5-nitro 1-mercaptobenzothiazole. It is possible to reduce the nitro group so introduced to form a second amino group in accordance with the method previously discussed in connection with the preparation of amino substituted mercapto aryl thiazoles such as 5-amino 1-mercaptobenzothiazole.

The nitro-substituted, amino-substituted, halogen-substituted, halogen- and nitro-substituted, and halogen- and amino-substituted mercapto aryl thiazoles described above may be appropriately reacted to yield corresponding metal salts, such, for example, as those of sodium, zinc, lead, etc. I have found such metal salts to be particularly useful as accelerators of the rate of vulcanization of rubber.

Although I have described in detail only the preferred embodiments of the invention, it will be apparent to those skilled in the art that the invention is not limited thereto, but that various modifications may be made without departing from the spirit of the invention or from the scope of the appended claims. For example, it will be obvious that in place of the 1-mercaptobenzothiazole derivatives specifically referred to herein, the corresponding derivatives of other mercapto aryl thiazoles such as the 1-mercapto tolyl thiazoles, the 1-mercapto xylyl thiazoles and the 1-mercapto naphthothiazoles may be employed equally well.

It is intended that the patent shall cover, by suitable expression in the appended claims, whatever features of patentable novelty reside in the invention.

What I claim is:

1. A mercapto aryl thiazole in which two hydrogen atoms of the aryl nucleus are respectively replaced by a nitrogen-containing group and a halogen atom.

2. A mercapto aryl thiazole in which two hydrogen atoms of the aryl nucleus are replaced respectively by a nitrogen-containing group and a chlorine atom.

3. A mercapto aryl thiazole containing an $NO_2$ group and a halogen atom in the aryl nucleus.

4. A mercapto aryl thiazole containing an $NO_2$ group and a chlorine atom in the aryl nucleus.

5. A method of treating mercapto aryl thiazoles which comprises introducing an $NO_2$ group into the aryl nucleus and subsequently reducing the $NO_2$ group to an amino group.

6. A method of treating mercapto aryl thiazoles which comprises introducing an $NO_2$ group into the aryl nucleus, reducing the group so introduced to an amino group, diazotizing the amino group and replacing the diazonium group with a halogen atom.

7. A method of treating mercapto aryl thiazoles which comprises introducing a nitro group into the aryl nucleus, reducing the nitro group to an amino group and diazotizing the amino group.

8. A method of treating mercapto aryl thiazoles which comprises dissolving a mercapto aryl thiazole in sulphuric acid, cooling the resulting solution and adding nitric acid.

9. A method of treating mercapto aryl thiazoles which comprises dissolving a mercapto aryl thiazole in concentrated sulphuric acid, adding nitric acid, segregating the resulting precipitate and subsequently treating the precipitate with a solution of ammonia.

10. A method of treating mercapto aryl thiazoles which comprises dissolving a mercapto aryl thiazole in concentrated sulphuric acid, adding nitric acid, segregating the resulting precipitate, dissolving the precipitate in a solution of ammonia, treating the solution so obtained with a dilute acid to produce a second precipitate and filtering off said second precipitate.

11. A method of treating mercapto aryl thiazoles which comprises dissolving a mercapto aryl thiazole in concentrated sulphuric acid, adding nitric acid to produce a precipitate, treating the precipitate with a hot solution of ammonia, acidifying the resulting solution to produce a second precipitate, and treating said second precipitate with a reducing agent.

12. A method of treating 1-mercapto aryl thiazoles which comprises dissolving a 1-mercapto aryl thiazole in concentrated sulphuric acid, adding nitric acid to produce a precipitate, separating the precipitate from the mother liquor, treating the precipitate with a hot solution of ammonia, acidifying the resulting solution to produce a second precipitate, dissolving said second precipitate, treating said second precipitate with a reducing agent and diazotizing.

13. A method of treating mercaptobenzothiazoles which comprises subjecting a mercaptobenzothiazole to the action of nitric acid to introduce a nitro group in the benzene ring, subsequently reducing the nitro group to an amino group, diazotizing the latter, and replacing the diazonium group by a chlorine atom.

14. A nitro mercapto aryl thiazole.

15. A nitro mercaptobenzothiazole.

16. A polynitro benzothiazyl sulphide.

17. A dinitro benzothiazyl sulphide.

18. A nitro benzothiazyl sulphide.

19. A dibenzenoidthiazyl sulphide comprising two connected benzenoid groups each of which is nitro-substituted, said benzenoid groups being connected by a linkage consisting of a first thiazyl group, not more than two sulphur atoms, and a second thiazyl group.

20. A dibenzothiazyl sulphide comprising two connected benzene groups both of which are nitro-substituted, said benzene groups being connected by a linkage consisting of a first thiazyl group, not more than two sulphur atoms, and a second thiazyl group.

21. A dibenzothiazyl polysulphide comprising two connected benzene groups at least one of which is nitro-substituted, said benzene groups being connected by a linkage consisting of a first thiazyl group, two adjacent sulphur atoms, and a second thiazyl group.

22. A dibenzenoidthiazyl polysulphide comprising two connected benzenoid groups at least one of which is nitro-substituted, said benzenoid groups being connected by a linkage consisting of a first thiazyl group, two adjacent sulphur atoms, and a second thiazyl group.

23. A benzenoid thiazyl sulphide having associated therewith a plurality of nitro groups.

24. A benzenoid thiazyl sulphide having at least one nitro group attached to a nuclear carbon atom thereof.

25. A benzenoid thiazyl sulphide having attached to nuclear carbon atoms thereof a plurality of nitro groups.

26. A mercapto aryl thiazole containing an amino group and a halogen atom in the aryl nucleus.

27. A mercapto aryl thiazole containing an amino group and a chlorine atom in the aryl nucleus.

28. An amino mercapto aryl thiazole.

29. An amino mercaptobenzothiazole.

30. An amino benzothiazyl sulphide.

31. A mercaptobenzothiazole containing an amino group and a halogen atom in the benzene nucleus.

32. A benzothiazyl sulphide having attached to the nucleus thereof a nitrogen-containing group selected from a class consisting of amino and nitro groups.

33. A benzothiazyl sulphide having attached to the nucleus thereof a halogen atom and a nitrogen-containing group selected from a class consisting of amino and nitro groups.

LORIN B. SEBRELL.